United States Patent [19]

Kweon

[11] Patent Number: 5,274,020
[45] Date of Patent: Dec. 28, 1993

[54] FAR INFRA-RED RAY RADIATING MATERIAL

[75] Inventor: Young Joon Kweon, Seoul, Rep. of Korea

[73] Assignee: Samwoo Far Infra-Red Ray Co., Ltd., Rep. of Korea

[21] Appl. No.: 755,720

[22] Filed: Sep. 6, 1991

[30] Foreign Application Priority Data

Sep. 24, 1990 [KR] Rep. of Korea .................. 9015146

[51] Int. Cl.$^5$ ............................................... C08K 5/04
[52] U.S. Cl. ................................. 524/394; 524/583; 523/100; 428/447; 428/689
[58] Field of Search ............ 428/447, 689; 526/351; 524/394, 583; 523/100

[56] References Cited

U.S. PATENT DOCUMENTS

| | | | |
|---|---|---|---|
| 4,216,107 | 11/1980 | Vogt et al. | 252/182 |
| 4,349,371 | 9/1982 | Van Laethem et al. | 65/60.4 |
| 4,423,180 | 12/1983 | Brizgys et al. | 524/394 |
| 4,666,981 | 5/1987 | Doura et al. | 525/100 |
| 4,721,877 | 1/1988 | Kawakatsu et al. | 313/111 |

*Primary Examiner*—George F. Lesmes
*Assistant Examiner*—Chris Raimund
*Attorney, Agent, or Firm*—Lieberman & Nowak

[57] ABSTRACT

Far infra-red ray radiating materials in which organic metal compounds or organic silicon compounds are used as radiating materials are disclosed. Examples of organic metal compounds which may be used in this invention are alkyl metal ester, alkyl metal chelate, alkyl metal acylate, metal chelated ester, metal alcoholate, and zirconium tetraacetylacetonate. Examples of organic silicon compounds which may be used in this invention are dimethyl dispoxy silan, and methyl triethoxy silan. The far infra-red radiating material manufactured by using the above compounds make it possible to express transparent color and have increased surface brightness, adhesive strength, and heat resistance, without lowering its standard of radiation rate in comparison with known radiating materials manufactured by using inorganic compounds.

1 Claim, No Drawings

FAR INFRA-RED RAY RADIATING MATERIAL

BACKGROUND OF THE INVENTION

This invention is concerned with far infra-red radiating materials made by using organometal compounds or organosilicon compounds.

Far infra-red rays can be described as infra-red rays with wavelengths in the region between 4–40 μm. Far infra-red rays have a positive influence on living things and/or organic compounds because they are resonant with natural vibrations of all organic compounds which exist on the earth.

As the effects of far infra-red rays are discovered, ceramic materials which radiate far infra-red rays have been recently developed from natural and/or artificial minerals, and utilized in various fields.

Examples of primary substances used for making far infra-red radiating ceramic materials known so far are as follows:

1. $Al_2O_3$ $SiO_2$ (Japanese Patent Publication No. 78-44928);
2. $ZrO_2$, $Y_2O_3$, $La_2O_3$ $CeO_2$ (Japanese Patent Laid-open No. 82-67073);
3. $Fe_2O_3$, $MgO$, $BaO$ (Japanese Patent Laid-Open No. 88-232268);
4. $SnO_2$, $Sb_2O_3$ (Japanese Patent Laid-Open No. 86-1755);
5. $TiO_2$, $CuO$ (Japanese Patent Laid-Open No. 85-251322).

The ceramic materials made by using the above described inorganic substances show relatively excellent radiation of far infra-red rays. Nevertheless, the utilization of them are rather restricted because of their high specific gravities, inferior transparencies, and weak intimacies with base materials.

SUMMARY OF THE INVENTION

It is an object of the invention to make a far infra-red ray radiating material by using organometal compounds and/or organosilicon compounds which have a lower specific gravity, superior transparency, and increased intimacy with base materials, compared to inorganic compounds.

Examples of organometal compounds and organosilicon compounds which may be used in this invention are alkyl metal ester, alkyl metal chelate, alkyl metal acylate, metal chelated ester, metal alcholate, zirconium tetraacetylacetonate and organoalkoxide silane.

The compounds shown in the above examples (hereinafter referred to as "said compounds") have been used widely as an ester exchange agent, cross-linking agent, heat resisting substance, condensing agent, surface active agent, curing agent, desiccating agent, corrosion inhibitor, and insulator. However, said compounds have never been used for making far infra-red ray radiating materials.

As a result of research to make far infra-red ray radiating materials light weight and transparent, it is found that said compounds also radiate far infra-red rays. Furthermore, in case said compounds are used with base materials properly, they can radiate the same standard of far infra-red rays as those radiated from known ceramic materials using inorganic compounds. Accordingly, it is natural that said compounds can be used as substitutes for inorganic compounds in making far infra-red radiating materials, not to speak of their original uses such as adhesive agent and cross-linking agent. In case of using the above compounds for making far infra-red ray radiating materials, it is possible to make them lighter, more transparent, and more intimate with the base materials. Thus, by using said compounds, the utilizations of far infra-red ray radiating materials are extended to the fields such as food packing paper, wall paper, and fabric.

For example, in the case of food packing paper, mixing inorganic ceramic materials with base materials in the past brought about not only unexpected changes in property, but many difficulties in expressing intended colors, especially natural colors of base materials and transparent colors because inorganic ceramic materials have inferior intimacies with base materials or pigments.

However, in the case of using organometal or organosilicon compounds in the present invention, due to their improved intimacies with base materials or pigments, color expression can be more unrestricted without making changes in property. Unlike those of the past, even transparent colors or natural colors of base materials can be expressed. Also, improved processing efficiency and strong adhesion with the base materials are accrued effects which are obtained by the original functions of the organic ceramic materials, i.e., the functions as desiccating agent and adhesive promoting agent.

Preferred and detailed embodiments of the present invention are as follows. ("%" in the following examples means "weight %").

EXAMPLES 1-5

In manufacturing plastic vessels for refrigerators, a transparent vessel can be obtained by the method of mixing polypropylene with 0–10% of zirconium tetraacetylacetonate and 0–20% of tetrastearyltitanate, and molding the mixture at 200° C. The far infra-red ray radiation rates of this vessel, measured at a wave length of 10 μm, are shown in Table 1.

TABLE 1

| Example No. | Tetrastearyl Titanate (Weight %) | Zirconium Tetra Acetylacetonate (Weight %) | Radiation Rate (%) |
|---|---|---|---|
| 1 | 0 | 10 | 90 |
| 2 | 5 | 8 | 96 |
| 3 | 10 | 5 | 98 |
| 4 | 15 | 3 | 94 |
| 5 | 20 | 0 | 89 |

EXAMPLES 6-10

A coated film can be obtained by the method of dissoluting the mixture of 0–20% of aluminium isopropylate, 0–10% of tetra stearyl titanate, and 0–10% of zirconium tetra acetylacetonate in the vehicle of pigments and coating a polypropylene film with this solution to be 12 μm thick. The far infra-red ray radiation rates of this coated film, measured at the wavelength of 10μm, are shown in Table 2.

TABLE 2

| Example No. | Aluminum Isopropylate (Weight %) | Tetrastearyl Titanate (Weight %) | Zirconium Tetra Acetylacetonate (Weight %) | Radiation Rate (%) |
|---|---|---|---|---|
| 6 | 0 | 10 | 5 | 90 |
| 7 | 5 | 8 | 3 | 98 |
| 8 | 10 | 5 | 8 | 97 |

TABLE 2-continued

| Example No. | Aluminum Isopropylate (Weight %) | Tetrastearyl Titanate (Weight %) | Zirconium Tetra Acetylacetonate (Weight %) | Radiation Rate (%) |
|---|---|---|---|---|
| 9 | 15 | 3 | 0 | 89 |
| 10 | 20 | 0 | 10 | 90 |

EXAMPLE 11

Dissolute 1 g of aluminium sec buthylate, 3 g of zirconium tetra acethylacetonate, and 4 g of tetrastearyltitanate in 1 g of isopropylalochol. Mix this solution with 10 g of dimethyldiethoxysilane and 4 g of water, and hydrolyze this mixture for 8 hrs. at room temperature. Thus, a vehicle is obtained. Then, 10 g of heat-resistant pigment is added to, and dispersed in this mixture which is used as a vehicle. Then, the mixture is dispersed again sufficiently in 23 g of a solution which is made by mixing isopropylalcohol and cellosolve acetate (1:1), followed by adding 2 g of tertiary amine curing agent. Spray the mixture made by the above method on the surface of stainless steel while applying heat (300° C.) to make a coated material, wherein coated thickness is 0.1 μm. The far infra-red ray radiation rate of this coated material, measured at a wavelength of 10 μm, is 95%. The coated material manufactured by the above method has advantages in that it has a good surface brightness, adhesive strength, and heat resistance in comparison with known coated materials in which inorganic substances are used as far infra-red ray radiation materials, because organic compounds used as far infra-red ray radiation materials in the above method facilitate hydrolysis and adhesion.

As described in the above examples, the far infra-red ray radiating materials of this invention have surprisingly increased surface brightness, adhesive strength, and heat resistance without lowering standard of the radiation rates in comparison with known materials. Furthermore, the far infra-red ray radiating material of this invention can be used more widely due to its ability to express transparent colors.

What is claimed is:

1. A method of manufacturing a far infra-red radiating material, which comprises mixing 0–10% by weight of zirconium tetraacetylacetonate and 0–20% by weight of tetrastearyltitanate with polypropylene, with the proviso that either zirconium tetraacetylacetonate or tetrastearyltitanate must be present.

* * * * *